United States Patent
Sharma et al.

(10) Patent No.: US 11,912,135 B2
(45) Date of Patent: Feb. 27, 2024

(54) BATTERY ELECTRIC VEHICLE ACCELERATOR PEDAL CONTROL BASED ON USER-SELECTABLE DECELERATION LIMIT AND DRIVER INTENT

(71) Applicants: Ashay Sharma, Troy, MI (US); Nadirsh Patel, Farmington Hills, MI (US); Achyut Venkataramu, Rochester Hills, MI (US)

(72) Inventors: Ashay Sharma, Troy, MI (US); Nadirsh Patel, Farmington Hills, MI (US); Achyut Venkataramu, Rochester Hills, MI (US)

(73) Assignee: FCA US LLC, Auburn Hills, MI (US)

( * ) Notice: Subject to any disclaimer, the term of this patent is extended or adjusted under 35 U.S.C. 154(b) by 374 days.

(21) Appl. No.: 17/211,438

(22) Filed: Mar. 24, 2021

(65) Prior Publication Data
US 2022/0305920 A1    Sep. 29, 2022

(51) Int. Cl.
*B60L 15/20*   (2006.01)
*B60K 26/02*   (2006.01)

(52) U.S. Cl.
CPC .............. *B60L 15/20* (2013.01); *B60K 26/02* (2013.01); *B60K 2026/025* (2013.01); *B60L 2240/423* (2013.01); *B60L 2250/28* (2013.01); *B60L 2260/42* (2013.01)

(58) Field of Classification Search
CPC .............. B60L 15/20; B60L 2240/423; B60L 2250/28; B60L 2260/42; B60K 26/02; B60K 2026/025
See application file for complete search history.

(56) References Cited

U.S. PATENT DOCUMENTS

| | | | |
|---|---|---|---|
| 4,461,988 A | * | 7/1984 | Plunkett ............... H02P 7/298 318/805 |
| 4,615,409 A | | 10/1986 | Kupper et al. |
| 4,671,577 A | | 6/1987 | Woods |
| 5,924,508 A | | 7/1999 | Clauss et al. |
| 6,554,744 B2 | | 4/2003 | Schmidt |
| 8,160,761 B2 | | 4/2012 | Heap et al. |
| 8,560,144 B2 | | 10/2013 | Mcgrogan |
| 9,238,412 B2 | | 1/2016 | Kidston et al. |

(Continued)

FOREIGN PATENT DOCUMENTS

CN   105480115 B   11/2017

*Primary Examiner* — Luis A Martinez Borrero
(74) *Attorney, Agent, or Firm* — Jeremy J. Klobucar

(57) ABSTRACT

A control system for an electrified powertrain of a battery electric vehicle (BEV) includes an accelerator pedal and a controller configured to determine maximum and minimum values for driver pedal position based on a first position of the accelerator pedal indicative of a first driver pedal position, determine whether the accelerator pedal position remains constant relative to the first position, when the accelerator pedal position does not remain constant and moves to a second position indicative of a second driver pedal position, detect that driver pedal position is increasing when the second driver pedal position is greater than the first minimum value and setting the first maximum value to the second driver pedal position and detect decreasing driver pedal position when the second driver pedal position is less than the first maximum value and setting the minimum value to the second driver pedal position.

18 Claims, 5 Drawing Sheets

(56) References Cited

U.S. PATENT DOCUMENTS

| | | |
|---|---|---|
| 9,702,315 B1 | 7/2017 | Palmer |
| 9,827,999 B2* | 11/2017 | Lai ................. B60R 16/037 |
| 9,950,640 B2* | 4/2018 | Lai ..................... B60L 50/10 |
| 9,975,450 B2* | 5/2018 | Lai ....................... B60L 3/12 |
| 10,173,550 B2* | 1/2019 | Lai ..................... F02D 28/00 |
| 10,611,259 B2* | 4/2020 | Lai ................. B60W 30/188 |
| 10,654,368 B2* | 5/2020 | Lai ..................... B60L 50/10 |
| 11,584,225 B2* | 2/2023 | Velazquez Alcantar ............... B60K 26/02 |
| 2002/0056581 A1 | 5/2002 | Mianzo et al. |
| 2003/0183431 A1* | 10/2003 | Cikanek ................. B60K 6/48 180/65.6 |
| 2004/0000887 A1* | 1/2004 | Lim ...................... B60K 1/00 318/432 |
| 2006/0224291 A1 | 10/2006 | Geist et al. |
| 2009/0112439 A1* | 4/2009 | Kuang ................ F02D 11/105 701/99 |
| 2010/0038158 A1 | 2/2010 | Whitney et al. |
| 2010/0317485 A1* | 12/2010 | Gillingham ............... B60L 7/12 180/242 |
| 2013/0162009 A1* | 6/2013 | Mitts ....................... B60L 7/26 303/3 |
| 2015/0352975 A1* | 12/2015 | Jung ....................... B60L 3/12 701/22 |
| 2016/0059703 A1* | 3/2016 | Miller ............ B60W 30/18127 701/22 |
| 2017/0113570 A1* | 4/2017 | Lai ..................... B60W 10/08 |
| 2017/0113571 A1* | 4/2017 | Lai ..................... B60L 50/51 |
| 2017/0113701 A1* | 4/2017 | Lai ..................... B60W 30/188 |
| 2018/0029608 A1* | 2/2018 | Lai ..................... B60W 10/08 |
| 2018/0154797 A1* | 6/2018 | Sawada ............... B60L 15/2018 |
| 2018/0236897 A1* | 8/2018 | Lai ..................... F02D 28/00 |
| 2018/0244158 A1* | 8/2018 | Komatsu ............... B60W 10/18 |
| 2020/0180432 A1* | 6/2020 | Gauthier ......... B60W 30/18127 |
| 2021/0031764 A1* | 2/2021 | Roques ................ B60W 50/10 |
| 2021/0245727 A1* | 8/2021 | Zhao ..................... B60L 15/20 |
| 2021/0402877 A1* | 12/2021 | Velazquez Alcantar ............... B60W 30/18181 |
| 2022/0176827 A1* | 6/2022 | Otanez ..................... B60K 1/00 |
| 2022/0266690 A1* | 8/2022 | Ortmann ............... B60K 26/02 |

* cited by examiner

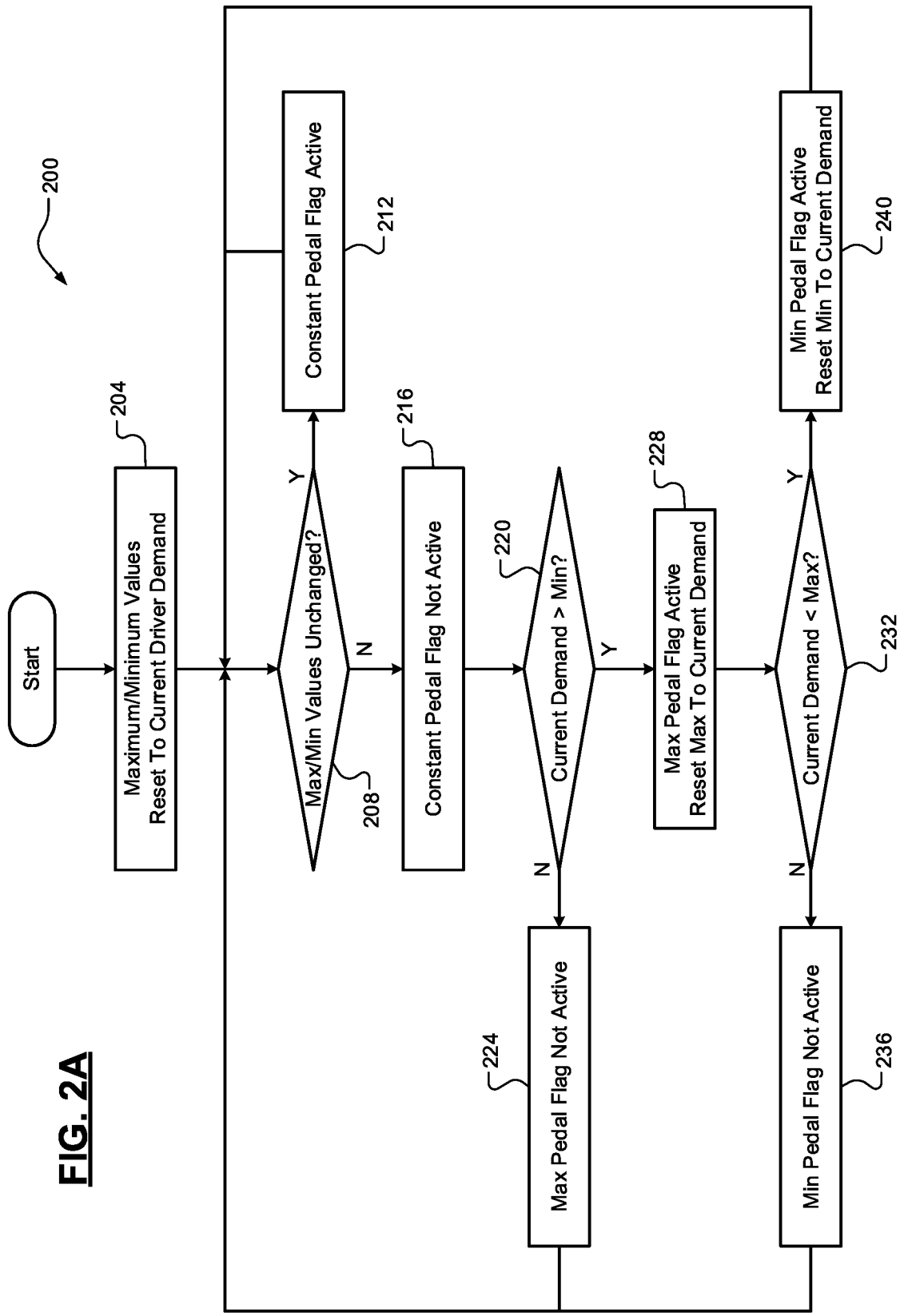

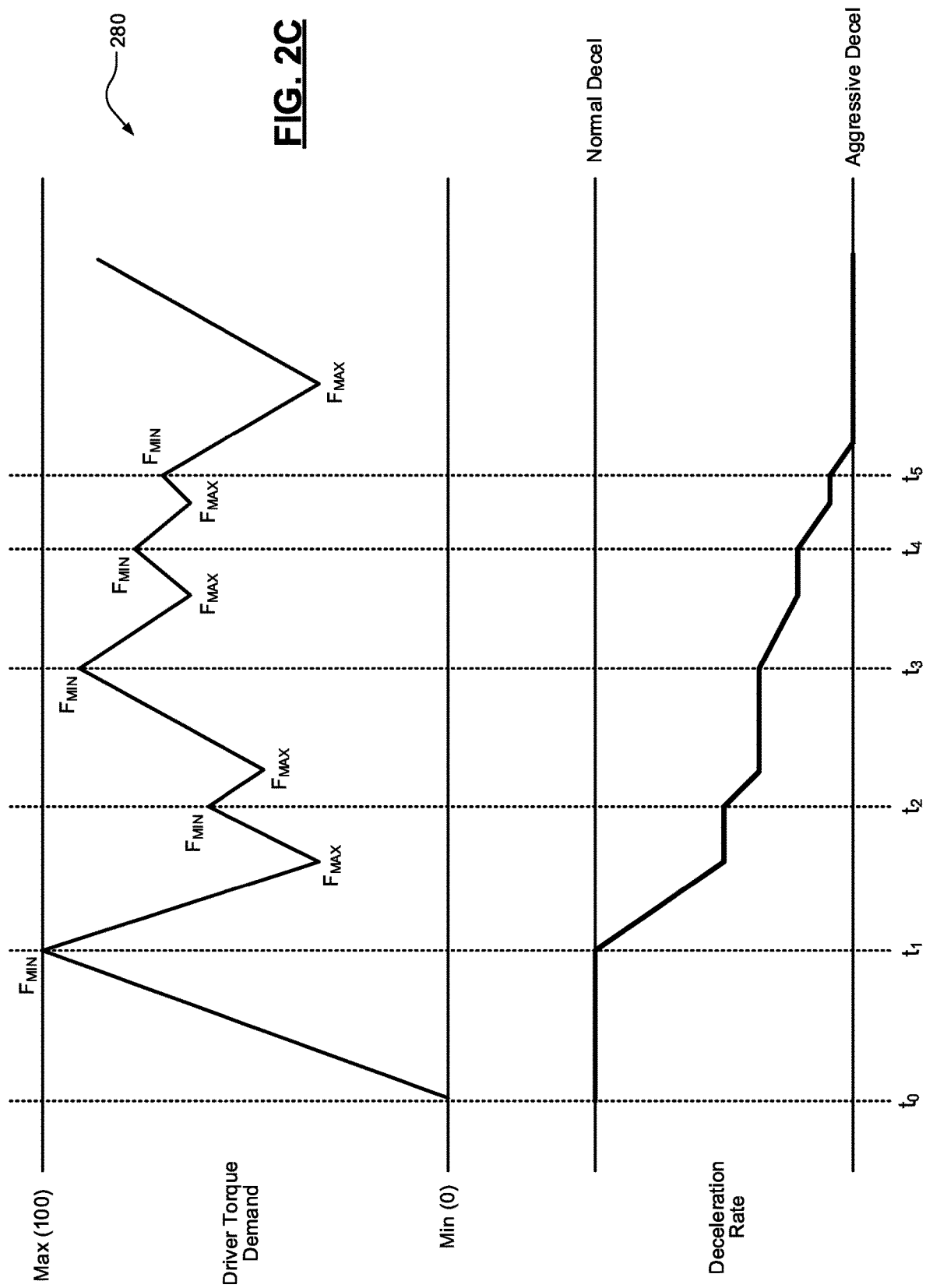

BATTERY ELECTRIC VEHICLE ACCELERATOR PEDAL CONTROL BASED ON USER-SELECTABLE DECELERATION LIMIT AND DRIVER INTENT

FIELD

The present application generally relates to electrified powertrains and, more particularly, to techniques for accelerator pedal control based on a user-selectable deceleration limit and driver intent in a battery electric vehicle (BEV).

BACKGROUND

A battery electric vehicle (BEV) has an electrified powertrain that comprises one or more electric motors for generating propulsive drive torque. Most drivers are used to engine-driven vehicles where engine friction causes vehicle deceleration when the accelerator pedal is fully-off. In a BEV, however, there is no engine and thus no engine friction. Thus, BEVs often command negative torque at the electrified powertrain during such scenarios to simulate an engine braking deceleration rate and recapture energy for storage in the battery system. Accelerator pedal position rate of change is typically monitored for controlling the electrified powertrain, but these techniques are susceptible to noise. Any change from a normal or base deceleration rate of the vehicle could also result in unexpected disturbances that are noticeable and potentially unpleasant to the driver. Accordingly, while such BEV electrified powertrain control systems do work for their intended purpose, there remains a desire for improvement in the relevant art.

SUMMARY

According to one example aspect of the invention, a control system for an electrified powertrain of a battery electric vehicle (BEV), the electrified powertrain being configured to generate drive torque to propel the BEV, is presented. In one exemplary implementation, the system comprises an accelerator pedal configured to be manipulated by a driver of the BEV between fully-off and fully-depressed positions and a controller in communication with the accelerator pedal and configured to control the electrified powertrain by determining maximum and minimum values for driver pedal position based on a first position of the accelerator pedal indicative of a first driver pedal position, determining whether the accelerator pedal position remains constant relative to the first position, when the accelerator pedal position does not remain constant and moves to a second position indicative of a second driver pedal position, detecting that driver pedal position is increasing when the second driver pedal position is greater than the first minimum value and setting the first maximum value to the second driver pedal position and detecting decreasing driver pedal position when the second driver pedal position is less than the first maximum value and setting the minimum value to the second driver pedal position, and controlling the electrified powertrain based on the accelerator pedal position and the maximum and minimum values for driver pedal position.

In some implementations, the controller is configured to control the electrified powertrain to generate drive torque between the maximum and minimum values for driver pedal position. In some implementations, the controller is further configured to receive driver input indicative of a request for a normal deceleration rate of the BEV or an aggressive deceleration rate of the BEV, wherein the aggressive deceleration rate is greater than the normal deceleration rate.

In some implementations, the aggressive deceleration rate provides for more energy recovery at the electrified powertrain for storage in a battery system of the BEV. In some implementations, based on the driver input, the controller is further configured to gradually transition from the normal deceleration rate to the aggressive deceleration rate over a period and only during sub-periods when driver pedal position is decreasing. In some implementations, the controller is further configured to hold the deceleration rate of the BEV steady between the normal deceleration rate and the aggressive deceleration rate during the period during sub-periods when driver pedal position is increasing.

In some implementations, based on the driver input, the controller is further configured to gradually transition from the aggressive deceleration rate to the normal deceleration rate over a period. In some implementations, the controller is further configured to increase torque output of the electrified powertrain when driver pedal position is less than the deceleration rate between the aggressive deceleration rate and the normal deceleration rate during the period to avoid a dead accelerator pedal scenario. In some implementations, the dead accelerator pedal scenario involves accelerator pedal manipulation indicative of a driver intent to accelerate the BEV.

According to another example aspect of the invention, a control method for an electrified powertrain of a BEV, the electrified powertrain being configured to generate drive torque to propel the BEV, is presented. In one exemplary implementation, the method comprises determining, by a controller of the BEV in communication with an accelerator pedal of the BEV, maximum and minimum values for driver pedal position based on a first position of the accelerator pedal indicative of a first driver pedal position, wherein the accelerator pedal is configured to be manipulated by a driver of the BEV between fully-off and fully-depressed positions, determining, by the controller, whether the accelerator pedal position remains constant relative to the first position, when the accelerator pedal position does not remain constant and moves to a second position indicative of a second driver pedal position, detecting, by the controller, that driver pedal position is increasing when the second driver pedal position is greater than the first minimum value and setting the first maximum value to the second driver pedal position and detecting, by the controller, decreasing driver pedal position when the second driver pedal position is less than the first maximum value and setting the minimum value to the second driver pedal position, and controlling, by the controller, the electrified powertrain based on the accelerator pedal position and the maximum and minimum values for driver pedal position.

In some implementations, controlling the electrified powertrain based on the accelerator pedal position and the maximum and minimum values for driver pedal position comprises controlling, by the controller, the electrified powertrain to generate drive torque between the maximum and minimum values for driver pedal position. In some implementations, the method further comprises receiving, by the controller, driver input indicative of a request for a normal deceleration rate of the BEV or an aggressive deceleration rate of the BEV, wherein the aggressive deceleration rate is greater than the normal deceleration rate.

In some implementations, the aggressive deceleration rate provides for more energy recovery at the electrified powertrain for storage in a battery system of the BEV. In some implementations, the method further comprises based on the driver input, gradually transitioning, by the controller, from the normal deceleration rate to the aggressive deceleration rate over a period and only during sub-periods when driver pedal position is decreasing. In some implementations, the method further comprises holding, by the controller, the deceleration rate of the BEV steady between the normal deceleration rate and the aggressive deceleration rate during the period during sub-periods when driver pedal position is increasing.

In some implementations, the method further comprises based on the driver input, gradually transitioning, by the controller, from the aggressive deceleration rate to the normal deceleration rate over a period. In some implementations, the method further comprises increasing, by the controller, torque output of the electrified powertrain when driver pedal position is less than the deceleration rate between the aggressive deceleration rate and the normal deceleration rate during the period to avoid a dead accelerator pedal scenario. In some implementations, the dead accelerator pedal scenario involves accelerator pedal manipulation indicative of a driver intent to accelerate the BEV.

Further areas of applicability of the teachings of the present application will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present application, its application or uses. Thus, variations that do not depart from the gist of the present application are intended to be within the scope of the present application.

BRIEF DESCRIPTION OF THE DRAWINGS

FIG. 2A is a flow diagram of an example driver intent and maximum/minimum driver pedal position value determination method according to the principles of the present application;

FIG. 2C is a plot of example operation of the methods of FIGS. 2A-2B according to the principles of the present application.

DETAILED DESCRIPTION

Figure 1:
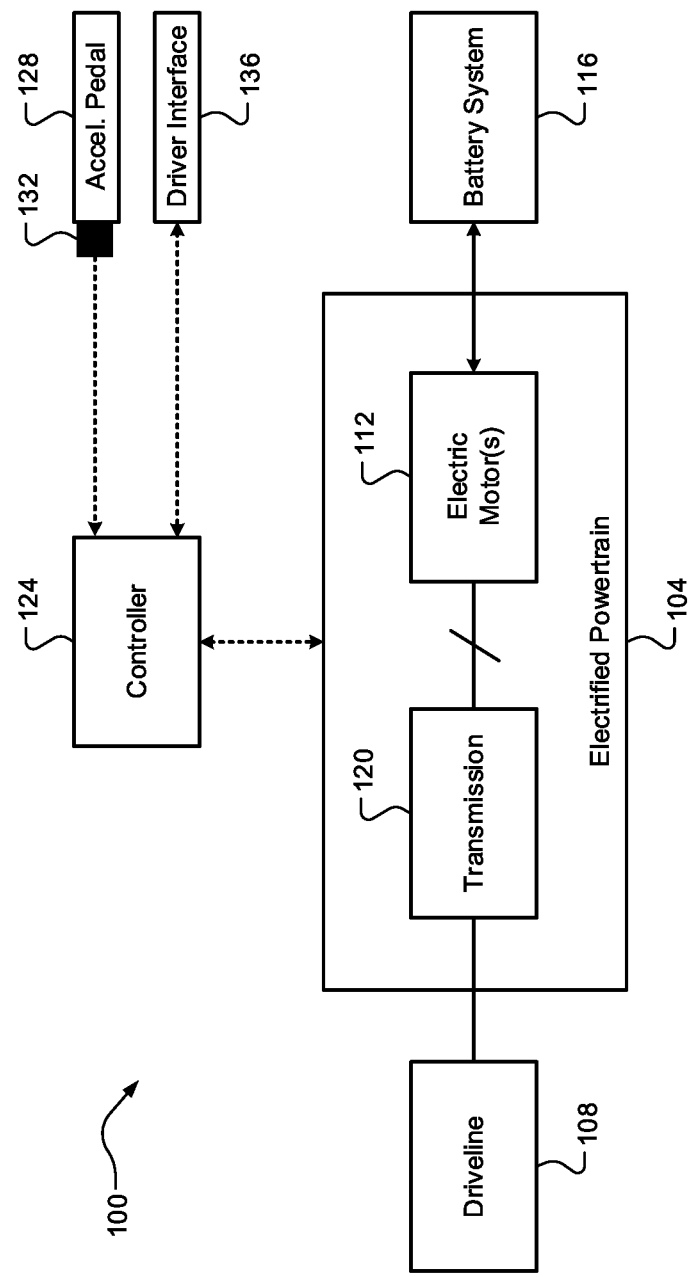
FIG. 1 is a functional block diagram of a battery electric vehicle (BEV) having an electrified powertrain control system according to the principles of the present application.

As previously mentioned, accelerator pedal position rate of change is typically monitored for controlling an electrified powertrain of a battery electric vehicle (BEV), but these techniques are susceptible to noise. Any change from a normal or base deceleration rate of the vehicle could also result in unexpected disturbances that are noticeable and unpleasant to the driver. Accordingly, improved BEV electrified powertrain control systems and methods are presented. These utilize techniques for continuously learning/updating driver maximum/minimum pedal position values based on driver intent via the accelerator pedal. The maximum/minimum pedal position values are continuously monitored and stored, and are periodically relearned depending on whether driver demand is increasing or decreasing. For example, if driver pedal position is increasing, the maximum value will be reset to the current pedal position to avoid being stuck at that value, which would be contrary to the driver's intent. Similarly, for example, if driver pedal position is decreasing, the minimum value will be reset to the current pedal position. Increasing/decreasing pedal position is determined based on differences between the current pedal position, the maximum/minimum values, and calibratable thresholds. These techniques are extended to a specific manner of entering or transitioning into the aggressive regeneration mode as well as a specific manner of exiting or transitioning out of the aggressive regeneration mode so as not to give a dead pedal feel to the driver. More specifically, the aggressive acceleration mode is entered in a step-manner such that the deceleration rate only increases during periods where driver pedal position is decreasing so as to not startle the driver or provide an unexpected feel. The aggressive acceleration mode is exited in a similar step-manner such that the deceleration rate increases without ever providing a dead pedal scenario to the driver where his/her intent is for the vehicle to be accelerating Referring now to FIG. 1, a functional block diagram of a BEV 100 having an example electrified powertrain control system according to the principles of the present application is illustrated. The BEV 100 comprises an electrified powertrain 104 configured to generate and transfer drive torque to a driveline 108 of the BEV 100. The electrified powertrain 104 comprises one or more electric motors 112 powered by a battery system 116 and configured to generate propulsive drive torque and a transmission 120 configured to transfer the propulsive drive torque to the driveline 108. It will be appreciated that the transmission 120 could optionally include one or more of the electric motors 112. The electric motor(s) 112 are capable of operating as both torque generators (as described above) as well as torque consumers to generate electrical energy that is capable of being stored in the battery system 116. This is also described herein as providing or generating a negative drive torque at the electrified powertrain 104, which causes the electric motor(s) 112 to act as torque consumers and also causes the BEV 100 to decelerate at a proportional rate, similar to engine friction on an engine-driven vehicle. A controller 124 controls operation of the electrified powertrain 104, such as to generate a desired drive torque based on driver input via an accelerator pedal 128 (between fully-off and fully-on or fully-depressed positions) as measured by an accelerator pedal sensor 132. The controller 124 is also configured to receiver other driver input, such as a driver input indicating a request to a normal deceleration rate or mode or an aggressive or maximum deceleration rate or mode as will more fully described below.

Figure 2B:
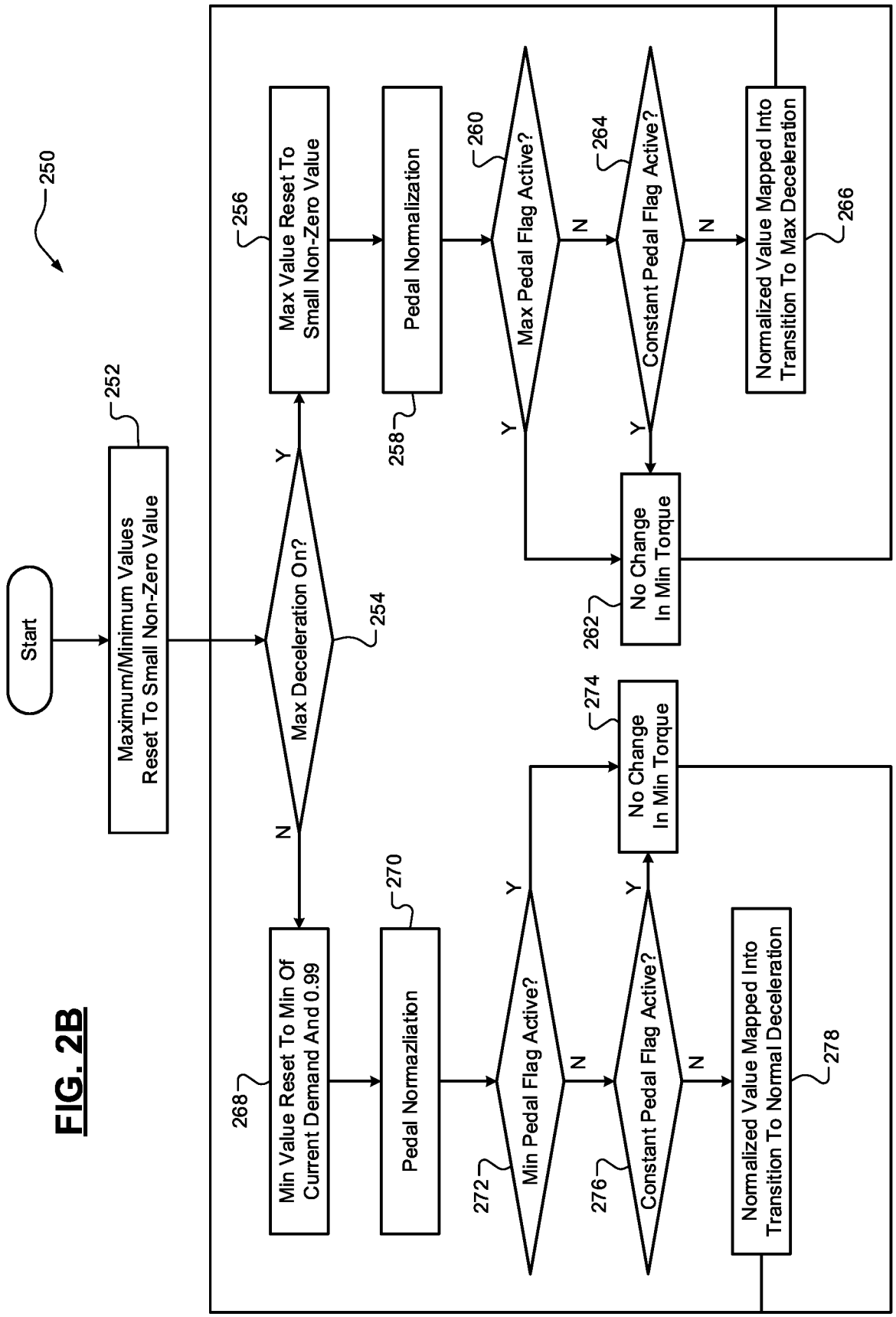
FIG. 2B is a flow diagram of an example aggressive regeneration mode entry method according to the principles of the present application.

Referring now to FIGS. 2A-2C, a flow diagram of an example driver intent and maximum/minimum driver pedal position value determination method 200, a flow diagram of an example aggressive regeneration mode entry method 250, and a plot 280 illustrating example operation of the methods 200, 250 according to the principles of the present application are illustrated. In FIG. 2A, the method 200 begins at 204. At 204, the controller 124 begins by resetting the maximum/minimum values for driver pedal position to a current driver pedal position. At 208, the controller 124 determines whether the maximum/minimum values have changed. When false (unchanged), the method 200 proceeds to 212 where a constant pedal flag is set to active and the method 200 returns to 208. When false (changed), the method 200 proceeds to 216 where the constant pedal flag is not set to active. At 220, the controller 124 determines whether the current driver pedal position is greater than the minimum value. When false, the method 200 proceeds to 224 where a maximum pedal flag is not set to active and the method 200 returns to 208. When true, the method 200 proceeds to 228 where the maximum pedal flag is set to active and the maximum value is reset to the current driver pedal position. At 232, the controller 124 determines whether the current driver pedal position is less than the maximum value. When false, the method 200 proceeds to 236 where a minimum pedal flag is not set to active and the method 200 returns to 208. When true, the method 200 proceeds to 240 where the minimum pedal flag is set to active and the minimum value is reset to the current driver pedal position and the method 200 returns to 208.

Referring now to FIGS. 2B and 2C and with continued reference to FIG. 2A and the discussion above, the method 250 begins at 252. At 252, the controller 124 resets the maximum/minimum values to small, non-zero values (e.g., 0.001) so as to avoid a divide by zero error. At 252, the controller 124 determines whether aggressive (max) deceleration is on or enabled. When true, the method 250 proceeds to 256. When false, the method 250 proceeds to 268. At 256, the controller 124 resets the maximum value to the small, non-zero value. At 258, the controller 124 performs pedal normalization for the rate of transition between the two deceleration curves (e.g., normal deceleration to aggressive deceleration). As an example, consider that the driver enabled the feature when pedal position was at 50%, and then tipped out to 40%. This would represent a delta or difference of 10%. In the normalization of the present application, the rate of deceleration is calculated as (Max−Current)/Max. Thus, for the above-presented example, the rate of deceleration would be (0.5−0.4)/0.5=0.2. This means that even though the driver tipped out by 10%, it resulted in a deceleration of 20%, or rather we are closer to the aggressive deceleration curve by 20%. In other words, since the feature was activated at 50% pedal, it becomes the max value and the subsequent tip outs are normalized to this new max value. However, if the driver tipped in greater than 50%, then that value is the new max value, and any tip outs after that are normalized to that newest value max. The purpose of this normalization is to effect a smooth transition between the two deceleration curves.

At 260, the controller 124 determines whether the maximum pedal flag is active. When true, the method 250 proceeds to 262 where no change in the minimum torque occurs and the method 200 returns to 254. When false, the method 250 proceeds to 264 where the controller 124 determines whether the constant pedal flag is active. When true, the method 200 proceeds to 262 similar to above. When false, however, the method 250 proceeds to 266 where the normalized value (based on the pedal normalization) is mapped into a gradual transition towards the aggressive (max) deceleration. In FIG. 2C, this is shown to occur between times $t_1$ and $t_2$, between times $t_2$ and $t_3$, between times $t_3$ and $t_4$, between times $t_4$ and $t_5$, and after time $t_5$ (every sub-period where the minimum pedal flag is active). After time $t_5$, the aggressive (max) deceleration rate is finally reached without negatively impacting the driver's experience.

Steps 268-278 illustrate the opposite procedure—the exit from aggressive (max) deceleration back to normal deceleration. At 268, the controller 124 resets the minimum value to the minimum of the current driver pedal position and a value of approximately but less than one (e.g., 0.99). At 270, the controller 124 performs pedal normalization. In this case, the aggressive-to-normal deceleration curve is transitioned using the normalization equation (Current−Min)/(1−Min) for the same reasons described above with respect to the normal-to-aggressive deceleration curve transition. At 272, the controller 124 determines whether the minimum pedal flag is active. When true, the method 250 proceeds to 274 where no change in the minimum torque occurs and the method 200 returns to 254. When false, the method 250 proceeds to 276 where the controller 124 determines whether the constant pedal flag is active. When true, the method 200 proceeds to 274 similar to above. When false, however, the method 250 proceeds to 278 where the normalized value (based on the pedal normalization) is mapped into a gradual transition towards the normal deceleration. This is not shown in FIG. 2C, but would affectively amount to increasing from the aggressive (max) deceleration back to the normal deceleration in a stepped-fashion similar to that shown from normal deceleration to aggressive (max) deceleration. This process then continues, e.g., until the end of a current key cycle after which the method 250 ends.

Figure 3:
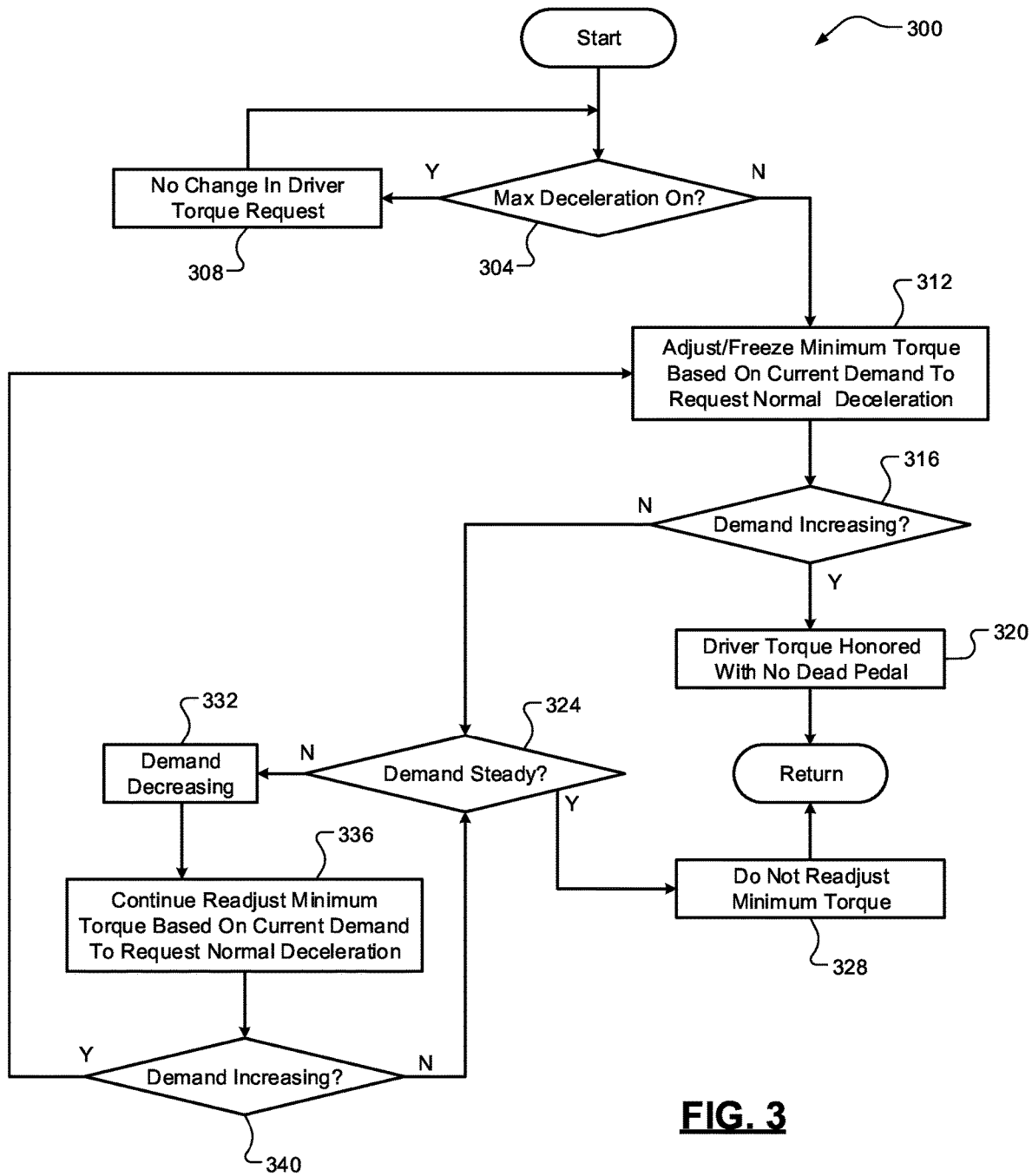
FIG. 3 is a flow diagram of an example aggressive regeneration mode exit and dead pedal avoidance method according to the principles of the present application.

Referring now to FIG. 3, a flow diagram of an example aggressive regeneration mode exit and dead pedal avoidance method 300 according to the principles of the present application is illustrated. It should be noted that on aspect of the aggressive (max) deceleration exit is already described above with respect to FIGS. 2B02C. This method 300 in particular focuses on the avoidance of a dead pedal scenario where the driver's manipulation of the accelerator pedal 128 indicates that he/she intends for and expects the BEV 100 to accelerate but, due to the varying pedal positions/limit values, no acceleration would occur in conventional systems, which is also described as a dead pedal scenario. At 304, the controller 124 determines whether the aggressive (max) deceleration mode is on or enabled. When false, the method 300 proceeds to 308 where no change in the driver pedal position/request occurs and the method 300 returns to 304. When true, the method 300 proceeds to 312 where the controller 124 adjusts/freezes minimum torque based on the current driver pedal position to request normal deceleration. At 316, the controller 124 determines whether the driver pedal position is increasing. When true, the method 300 proceeds to 320 where the driver pedal position is honored to avoid the dead pedal scenario from occurring and the method 300 ends or returns to 304. When false, the method 300 proceeds to 324 where the controller 124 determines whether the driver pedal position is remaining steady (or within a threshold amount from constant). When true, the method 300 proceeds to 328 where minimum torque is not readjusted with no dead pedal scenario occurring and the method 300 ends or returns to 304. When true, however, the method 300 proceeds to 332 where the controller 124 determines that the driver pedal position is decreasing. At 335, the controller 124 then continues to readjust the minimum torque based on the current pedal position to request normal deceleration. At 340, the controller 124 determines whether the driver pedal position is increasing. When false, the method 300 returns to 324. When true, the method 300 returns to 312.

It will be appreciated that the term "controller" as used herein refers to any suitable control device(s) that is/are configured to perform at least a portion of the techniques of the present application. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present application. The one or more processors could be either a single processor or two or more processors operating in a parallel or distributed architecture.

It should also be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A control system for an electrified powertrain of a battery electric vehicle (BEV), the electrified powertrain being configured to generate drive torque to propel the BEV, the control system comprising:
an accelerator pedal configured to be manipulated by a driver of the BEV between fully-off and fully-depressed positions; and
a controller in communication with the accelerator pedal and configured to control the electrified powertrain by:
determining maximum and minimum values for driver pedal position based on a first position of the accelerator pedal indicative of a first driver pedal position;
determining whether the accelerator pedal position remains to within a threshold amount of the first position;
when the accelerator pedal position does not remain within the threshold amount of the first position and moves to a second position indicative of a second driver pedal position:
detecting that driver pedal position is increasing when the second driver pedal position is greater than the minimum value and setting the maximum value to the second driver pedal position, and
detecting decreasing driver pedal position when the second driver pedal position is less than the maximum value and setting the minimum value to the second driver pedal position; and
controlling the electrified powertrain based on the accelerator pedal position and the maximum and minimum values for driver pedal position.

2. The system of claim 1, wherein the controller is configured to control the electrified powertrain to generate drive torque between the maximum and minimum values for driver pedal position.

3. The system of claim 1, wherein the controller is further configured to receive driver input indicative of a request for a first deceleration rate of the BEV or second deceleration rate of the BEV, wherein the second deceleration rate is greater than the first deceleration rate.

4. The system of claim 3, wherein the second deceleration rate provides for more energy recovery at the electrified powertrain for storage in a battery system of the BEV.

5. The system of claim 3, wherein, based on the driver input, the controller is further configured to transition from the first deceleration rate to the second deceleration rate over a period and only during sub-periods when driver pedal position is decreasing.

6. The system of claim 5, wherein the controller is further configured to maintain the deceleration rate of the BEV between the normal first deceleration rate and the second deceleration rate during sub-periods when driver pedal position is increasing.

7. The system of claim 3, wherein, based on the driver input, the controller is further configured to transition from the second deceleration rate to the first deceleration rate over a period.

8. The system of claim 7, wherein the controller is further configured to increase torque output of the electrified powertrain when driver pedal position is less than the deceleration rate between the second deceleration rate and the first deceleration rate during the period to avoid a dead accelerator pedal scenario.

9. The system of claim 8, wherein the dead accelerator pedal scenario would involve an accelerator pedal manipulation indicative of a driver request to accelerate the BEV where the BEV does not actually accelerate in response thereto.

10. A control method for an electrified powertrain of a battery electric vehicle (BEV), the electrified powertrain being configured to generate drive torque to propel the BEV, the method comprising:
determining, by a controller of the BEV in communication with an accelerator pedal of the BEV, maximum and minimum values for driver pedal position based on a first position of the accelerator pedal indicative of a first driver pedal position, wherein the accelerator pedal is configured to be manipulated by a driver of the BEV between fully-off and fully-depressed positions;
determining, by the controller, whether the accelerator pedal position remains within a threshold amount of the first position;
when the accelerator pedal position does not remain within the threshold amount from the first position and moves to a second position indicative of a second driver pedal position:
detecting, by the controller, that driver pedal position is increasing when the second driver pedal position is greater than the minimum value and setting the maximum value to the second driver pedal position, and
detecting, by the controller, decreasing driver pedal position when the second driver pedal position is less than the maximum value and setting the minimum value to the second driver pedal position; and
controlling, by the controller, the electrified powertrain based on the accelerator pedal position and the maximum and minimum values for driver pedal position.

11. The method of claim 10, wherein controlling the electrified powertrain based on the accelerator pedal position and the maximum and minimum values for driver pedal position comprises controlling, by the controller, the electrified powertrain to generate drive torque between the maximum and minimum values for driver pedal position.

12. The method of claim 10, further comprising receiving, by the controller, driver input indicative of a request for a first deceleration rate of the BEV or second deceleration rate of the BEV, wherein the second deceleration rate is greater than the first deceleration rate.

13. The method of claim 12, wherein the second deceleration rate provides for more energy recovery at the electrified powertrain for storage in a battery system of the BEV.

14. The method of claim 12, further comprising based on the driver input, transitioning, by the controller, from the first deceleration rate to the second deceleration rate over a period and only during sub-periods when driver pedal position is decreasing.

15. The method of claim 14, further comprising maintaining, by the controller, the deceleration rate of the BEV between the first deceleration rate and the second deceleration rate during sub-periods when driver pedal position is increasing.

16. The method of claim 12, further comprising based on the driver input, transitioning, by the controller, from the second deceleration rate to the first deceleration rate over a period.

17. The method of claim 16, further comprising increasing, by the controller, torque output of the electrified powertrain when driver pedal position is less than the deceleration rate between the second deceleration rate and the first deceleration rate during the period to avoid a dead accelerator pedal scenario.

18. The method of claim 17, wherein the dead accelerator pedal scenario would involve an accelerator pedal manipulation indicative of a driver request to accelerate the BEV where the BEV does not actually accelerate in response thereto.

* * * * *